US009798756B2

(12) United States Patent
Kim et al.

(10) Patent No.: US 9,798,756 B2
(45) Date of Patent: Oct. 24, 2017

(54) SYSTEMS, METHODS AND COMPUTER PROGRAM PRODUCTS FOR PROBING A HASH TABLE FOR IMPROVED LATENCY AND SCALABILITY IN A PROCESSING SYSTEM

(71) Applicant: International Business Machines Corporation, Armonk, NY (US)

(72) Inventors: Min-Soo Kim, Dalseong-Gun (KR); Lin Qiao, San Jose, CA (US); Vijayshankar Raman, Sunnyvale, CA (US); Eugene J. Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/725,479

(22) Filed: May 29, 2015

(65) Prior Publication Data
US 2015/0261751 A1    Sep. 17, 2015

Related U.S. Application Data

(63) Continuation of application No. 13/558,178, filed on Jul. 25, 2012, now Pat. No. 9,069,810.

(51) Int. Cl.
G06F 17/30    (2006.01)
G06F 12/0802  (2016.01)

(52) U.S. Cl.
CPC .... *G06F 17/3033* (2013.01); *G06F 17/30097* (2013.01); *G06F 17/30109* (2013.01);
(Continued)

(58) Field of Classification Search
CPC ............... G06F 17/30; G06F 17/30091; G06F 17/30321; G06F 17/03–17/613; G06F 17/30097; G06F 17/3033; G06F 17/30949
(Continued)

(56) References Cited

U.S. PATENT DOCUMENTS 5,532,694 A * 7/1996 Mayers ................... G06T 9/005
                                                    341/67
5,838,963 A * 11/1998 Griffiths .............. H03M 7/3088
(Continued)

FOREIGN PATENT DOCUMENTS

EP          1970821 A1     9/2008
KR       20020021232 A     3/2002

OTHER PUBLICATIONS

Teryl Taylor et al.; "Toward Efficient Querying of Compressed Network Payloads", 13 pages, May 2, 2012.*
Blanas, S. et al., "Design and Evaluation of Main Memory Hash Join Algorithms for Multi-core CPUs", Proceedings of the 2011 International Conferences on Management of Data (SIGMOD'11), Jun. 12-16, 2011, pp. 1-12, ACM, United States.
(Continued)

*Primary Examiner* — Monica Pyo
(74) *Attorney, Agent, or Firm* — Sherman IP LLP; Kenneth L. Sherman; Steven Laut

(57) ABSTRACT

System, method and computer program products for probing a hash table by receiving a compressed input key, computing a hash value for the compressed input key and probing one or more buckets in a hash table for a match. Each bucket includes multiple chunks. For a bucket in the hash table, chunks are searched in that bucket by comparing in parallel the hash value with multiple slots in each chunk, such that if a value in a chunk equals the hash value of the compressed input key, then a match is declared and a vector is returned with a significant bit of a matching slot in the bucket set to a value. If a value stored in a chunk corresponds to an empty slot, then a mismatch is declared, and the vector is returned as the result with the significant bit of a matching empty slot set to the value.

20 Claims, 7 Drawing Sheets

(52) U.S. Cl.
CPC .... *G06F 17/30864* (2013.01); *G06F 12/0802* (2013.01); *G06F 2212/1044* (2013.01); *G06F 2212/465* (2013.01)

(58) Field of Classification Search
USPC .......................... 707/747, 736, 761; 711/170
See application file for complete search history.

(56) References Cited

U.S. PATENT DOCUMENTS

| | | | |
|---|---|---|---|
| 5,970,252 A * | 10/1999 | Buxton | G06F 9/4428 717/116 |
| 7,424,591 B2 | 9/2008 | Ross | |
| 7,650,429 B2 | 1/2010 | Panigraphy et al. | |
| 7,752,414 B2 | 7/2010 | Ross | |
| 8,108,401 B2 | 1/2012 | Qiao et al. | |
| 8,380,688 B2 | 2/2013 | Gruhl et al. | |
| 2004/0143701 A1* | 7/2004 | Giambalvo | G11C 15/00 711/108 |
| 2009/0006346 A1* | 1/2009 | C N | G06F 17/30454 |
| 2011/0131198 A1 | 6/2011 | Johnson et al. | |
| 2011/0179050 A1 | 7/2011 | Parsons et al. | |
| 2014/0032569 A1* | 1/2014 | Kim | G06F 17/3033 707/747 |
| 2014/0214794 A1* | 7/2014 | Attaluri | G06F 17/30466 707/714 |
| 2014/0214855 A1* | 7/2014 | Attaluri | G06F 17/30339 707/747 |
| 2014/0372407 A1* | 12/2014 | Attaluri | G06F 17/30466 707/714 |

OTHER PUBLICATIONS

Zukowski, M. et al., "Architecture-Conscious Hashing", Proceedings of the 2006 Second International Workshop on Data Management on New Hardware (DaMoN 2006), Jun. 25, 2006, pp. 1-8, ACM, United States.

Cieslewicz, J. et al., "Database Optimizations for Modern Hardware," Proceedings of the IEEE, May 2008, pp. 863-878, vol. 96, No. 5, IEEE, United States.

Ross, K.A., "Efficient Hash Probes on Modern Processors," Proceedings of the IEEE 23rd International Conference on Data Engineering (ICDE '07), 2007, pp. 1297-1301, IEEE, United States.

Herlihy, M. et al., "Hopscotch Hashing," Proceedings of the 22nd International Symposium on Distributed Computing (DISC '08), 2008, pp. 350-364, Springer-Verlag, Berlin, Germany.

Cieslewicz, J. et al., "Automatic Contention Detection and Amelioration for Data-Intensive Operations," Proceedings of the 2010 ACM SIGMOD International Conference on Management of Data (SIGMOD '10), 2010, pp. 483-494, ACM, United States.

Lim, H. et al., "SILT: A Memory-Efficient, High-Performance Key-Value Store", Proceedings in the 23rd ACM Symposium on Operating Systems Principles (SOSP '11), Oct. 23-26, 2011, pp. 1-13, Cascais, Portugal.

U.S. Non-Final Office Action for U.S. Appl. No. 13/558,178 mailed Jun. 17, 2014.

U.S. Final Office Action for U.S. Appl. No. 13/558,178 mailed Dec. 24, 2014.

U.S. Notice of Allowance for U.S. Appl. No. 13/558,178 mailed Feb. 27, 2015.

\* cited by examiner

| Key 1 | Key 2 | Key 3 | ... | Key 25 | Payload 1 | Payload 2 | Payload 3 | ... | Payload 25 | Padding |
|---|---|---|---|---|---|---|---|---|---|---|
| 10 Bits | 10 Bits | 10 Bits | ... | 10 Bits | 10 Bits | 10 Bits | 10 Bits | ... | 10 Bits | 12 Bits |

Hash Table Bucket (512 bits) - Open Addressing

FIG. 5A

| Key 1 | Key 2 | Key 3 | ... | Key 22 | Payload 1 | Payload 2 | Payload 3 | ... | Payload 22 | Padding | Pointer |
|---|---|---|---|---|---|---|---|---|---|---|---|
| 10 Bits | 10 Bits | 10 Bits | ... | 10 Bits | 10 Bits | 10 Bits | 10 Bits | ... | 10 Bits | 8 Bits | 64 Bits |

Hash Table Bucket (512 bits) - Closed Addressing

FIG. 5B

SYSTEMS, METHODS AND COMPUTER PROGRAM PRODUCTS FOR PROBING A HASH TABLE FOR IMPROVED LATENCY AND SCALABILITY IN A PROCESSING SYSTEM

BACKGROUND

The present invention relates generally to an improved data processing system and in particular to a method and apparatus for probing a hash table in a memory device.

Emerging processors provide growing computation power by increasing the number of processing cores, by increasing the degree of hyper-threading, and/or by vector processing. However, the amount of available cache or memory for such processors remains limited. As a result, the amount of available cache per processing core is reduced. There are more cores (and hence more threads) issuing more memory I/O requests, which causes an executing program to encounter a memory bandwidth limit (also know as a memory wall). The memory bandwidth problem results in a performance bottleneck which prevents linear performance scaling with increasing number of processing cores (and threads).

Hashing is a commonly used technique for providing access to data based on a key in constant expected time. Hashing is used in database systems for joins, aggregation, duplicate-elimination, and indexing. In a database context, hash keys are typically single column values or a tuple of values for a small number of columns. Payloads in a hash table may be full records, pointers, or record identifiers, to records, or they may represent values of an aggregate computed using hash aggregation.

Conventional hash tables perform poorly, in terms of time required for hashing, on processors due to branch mispredictions, cache misses, and poor instruction-level parallelism. Conventional hash tables also have space overheads. Further, conventional approaches do not address the decreasing per-core-cache-size and resulting performance limitations.

SUMMARY

Embodiments of the present invention provide a system, method and computer program products for reducing hash table working-set size for improved latency and scalability in a processing system. An exemplary embodiment includes a method for storing data on a computer by computing a plurality of hash functions of data values in a data item, and determining a corresponding memory location for one of the plurality of hash functions of data values in the data item, wherein each memory location is of a cacheline size. Storing data in a memory location includes storing the data item in the memory location, wherein each memory location stores a plurality of stored data items. Storing data further includes storing a key portion of all data items contiguously within the memory location, and storing a payload portion of all data items contiguously within the memory location. Wherein the payload portions are packed as bit-aligned in a fixed-sized memory location.

In one embodiment, the memory location comprises a bucket in a bucketized hash table, and each bucket is sized to store multiple key portions and payload portion. The payload portions are packed as bit-aligned in a fixed-sized bucket, and corresponding key portions are stored as compressed keys in said fixed-sized bucket.

In one embodiment, probing the hash table includes receiving an input key, computing a hash value for the input key and probing one or more buckets in the hash table for a match, each bucket including multiple chunks. Probing comprises, for a bucket in the hash table, searching chunks in that bucket by comparing the hash value with stored values, such that if a value stored in a chunk equals the hash value of the input key, then a match is declared. Otherwise, if no chunks remain to be searched in the bucket, searching a next bucket in the hash table.

In one embodiment, probing and storing operations are performed on a bucket without data extraction and decompression, even when the keys are stored compressed. Probing the hash table comprises utilizing a parallel data processing scheme to compare a value against multiple slots in a chunk simultaneously, wherein each slot is sized to store a key portion.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 5A-5B show example hash tables, according to embodiments of the invention;

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Embodiments of the present invention relate to reducing hash table working-set size for improved latency and scalability in a processing system. Hash tables are the most widely used data structures to achieve constant time lookup. In a database management system, hash tables have been used for doing grouping and join efficiently. The performance of hash table key insertion and key probing is crucial to the overall database query performance and memory bandwidth bottlenecks. Embodiment of the invention achieve linear multi-threaded scaling by reducing the per-thread working-set size and hence better fitting it into caches.

In one embodiment the present invention provides a cache-conscious hash table system that store keys and payloads tightly packed as bit-aligned in a fixed-sized hash table bucket, and probe and insert a key with data parallelism. The hash table system is useful with general hash tables such as an open-addressing hash table, with linear probing, quadratic probing, or cuckoo hashing, and closed-addressing hash tables with chaining, etc.

Figure 1:
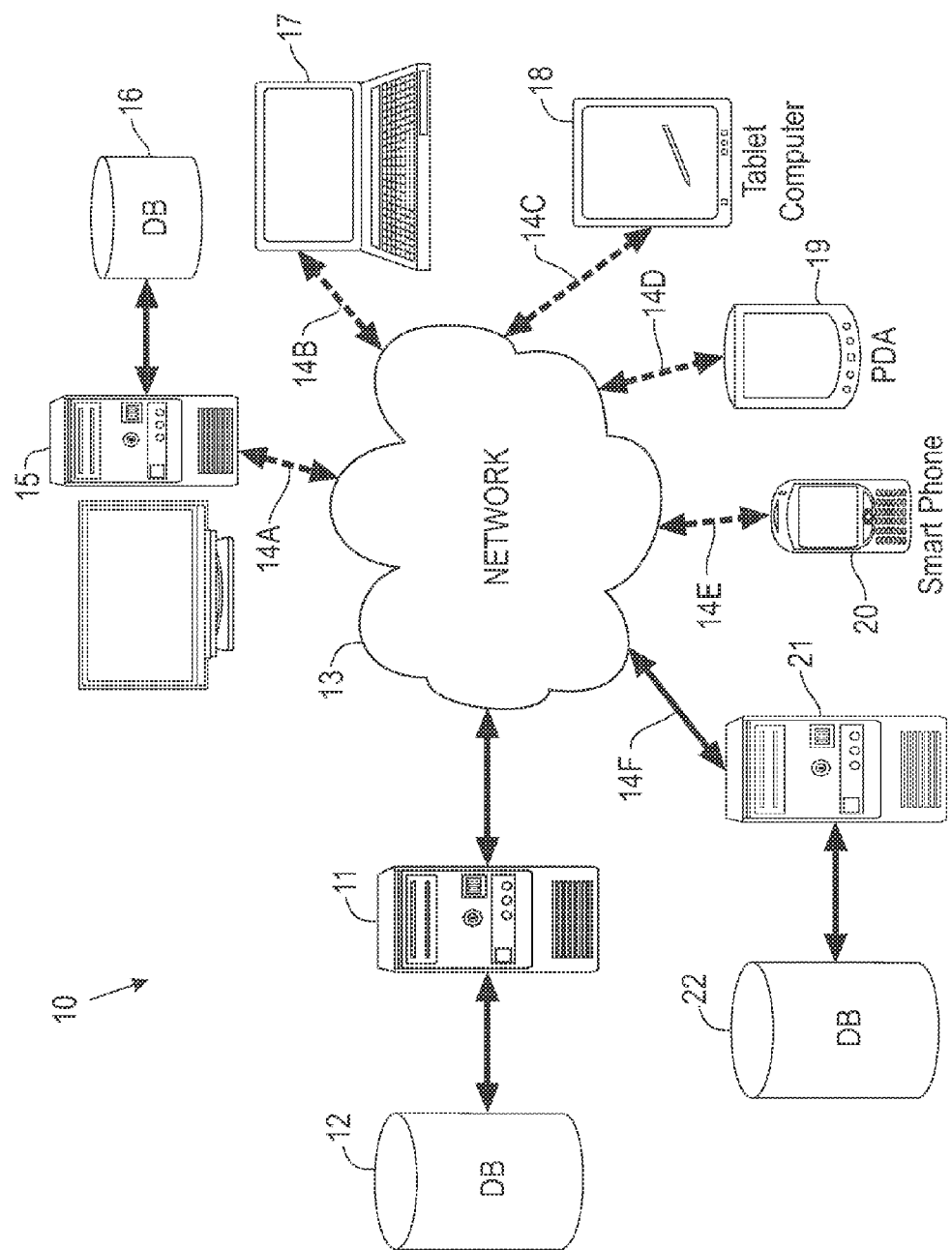
FIG. 1 is a block diagram illustrating an example system for storing data using a hashing system, according to an embodiment of the present invention.

Referring now to the drawings, in which like numerals illustrate like elements throughout the several views, FIG. 1 illustrates an example of the basic components of a system 10 utilizing a hashing system 100 (FIG. 2) with reduced hash table working-set size for improved latency and scalability in a processing system, such as a multi-core processing system, used in connection with a preferred embodiment of the present invention. The system 10 includes a server 11 and the remote devices 15 and 17-20 that utilize the estimation system of the present invention.

Each of the remote devices 15 and 17-20 has applications and can have a local database 16. Server 11 contains applications, and a database 12 that can be accessed by remote device 15 and 17-20 via connections 14(A-F), respectively, over network 13. In one implementation, the server 11 executes software for a computer network and controls access to itself and database 12.

The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to LAN within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. Thus, when a user at one of the remote devices 15 and 17-20 desires to access data from the database 12 at the server 11, the remote device 15 and 17-20 communicates over the network 13, to access the server 11 and database 12.

The system 10 may include third party computer systems 21 and databases 22. The hashing system 100 utilizes hashing process for reducing hash table working-set size for improved latency and scalability in a processing system, according to an embodiment of the invention. Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
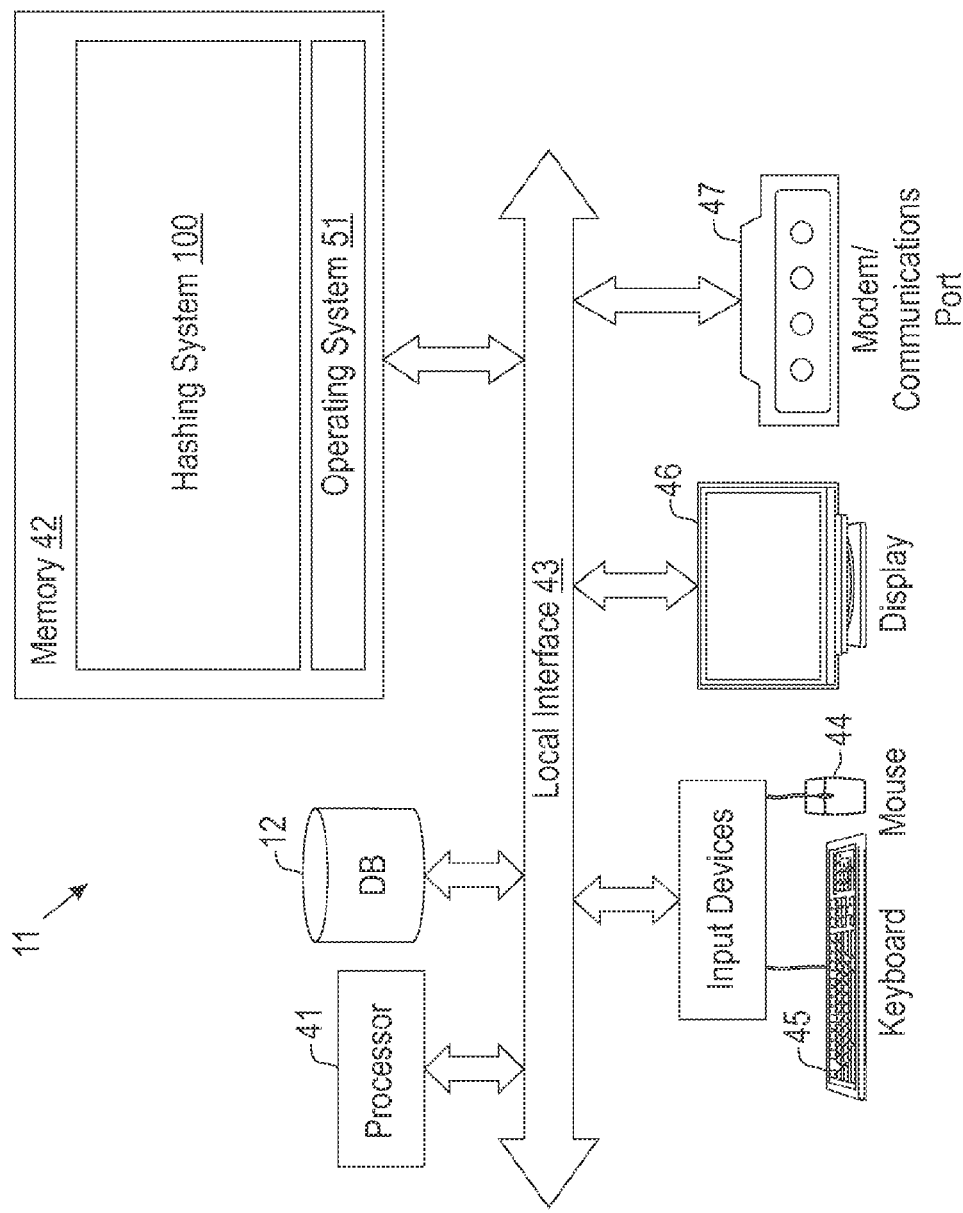
FIG. 2 is a block diagram illustrating an example of a server utilizing a hashing process, according to an embodiment of the present invention, as shown in FIG. 1.

Illustrated in FIG. 2 is a block diagram demonstrating an example of server 11, as shown in FIG. 1, utilizing the hashing system 100 according to an embodiment of the present invention. The server 11 includes, but is not limited to, PCs, workstations, laptops, PDAs, palm devices and the like. The processing components of the third party computer systems are similar to that of the description for the server 11 (FIG. 2). In another embodiment, the hashing system 100 may be implemented in the computer system 21.

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device (such as a single core or multi-core processor) for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the hashing system 100 of the present invention. The hashing system 100 comprises functional components and process blocks described further below.

The operating system 51 essentially controls the execution of other computer programs, such as the hashing system 100, and provides scheduling, input/output control, file and data management, memory management, and communication control and related services. However, the hashing system 100 of the present invention is applicable on all other commercially available operating systems.

The hashing system 100 may comprise a source program, executable program (object code), script, or any other entity comprising a set of computer program instructions to be performed. When the hashing system 100 is a source program, then the program is usually translated via a compiler, assembler, interpreter, or the like, which may or may not be included within the memory 42, so as to operate properly in connection with the O/S 51. Furthermore, the hashing system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a RF or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The hashing system 100 and the O/S 51 are read, in whole or in part, by the processor 41, perhaps buffered within the processor 41, and then executed.

When the hashing system 100 is implemented in software, as is shown in FIG. 2, it should be noted that the estimation system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electro-magnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the hashing system 100 is implemented in hardware, the estimation system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the estimation system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. Hereinafter, the remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the description herein, the following notations are used for describing how keys and payloads are stored in a hash table, according to embodiments of the invention:

Bucket: A hash table bucket stores multiple keys and payloads. It is of a cacheline size, or a small multiple thereof. Keys and payloads do not straddle buckets. A cacheline (cache block) contains the actual data fetched from the main memory. A cacheline is the smallest unit of memory than can be transferred between the main memory and a cache.

Chunk: A chunk is fixed size unit within a bucket, where the size is selected to be a number of bits that is appropriate for processing efficiency, typically a machine word size. In one example, each chunk is 64-bits long. A bucket includes multiple chunks, one after another. Keys and payloads can straddle chunks.

Slot: A slot in a bucket is of a size to hold a key. A key slot can either hold a key or be empty. A chunk includes one or more slots.

According to embodiments of the invention, the hashing system 100 implements a hashing process (hashing scheme) for processors. One aspect of the illustrative embodiments provide for storing data items in a computer. One or more hash functions of data values in a data item is computed. A corresponding memory location is determined for one of the plurality of hash functions of data values in the data item. The data item is stored in the memory location. Each memory location stores a plurality of stored data items.

An alternative aspect of the illustrative embodiments provides for retrieving data items in a computer. A plurality of hash functions of data values in a probe key is computed. A corresponding memory location is determined for each of the hash functions of data values in the probe key. The stored data items in each memory location are examined to determine a presence of a match with the probe key, where each memory location stores a plurality of stored data items. A payload of the matching stored data item is returned in response to a match between a stored data item and the probe key. The methods for the different aspects may be performed in a data processing system, such as shown in FIGS. 1-2.

Figure 3:
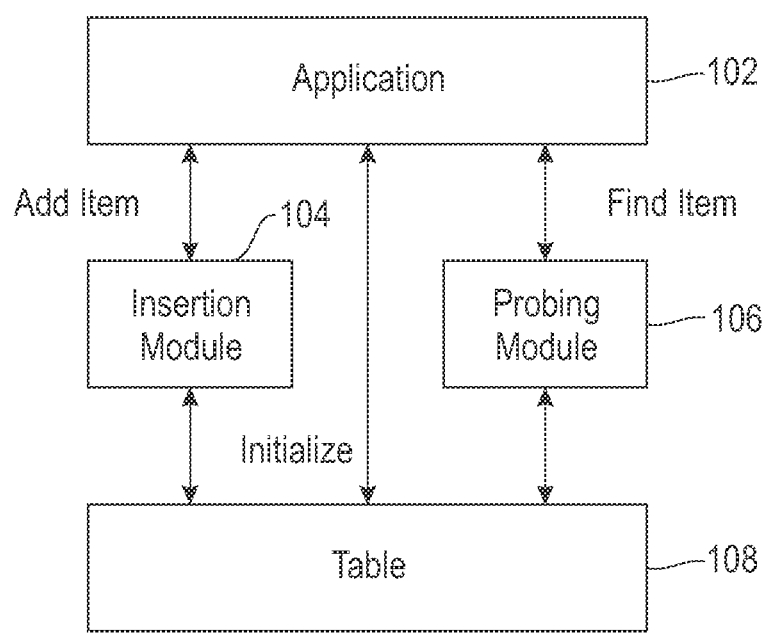
FIG. 3 is a block diagram illustrating a hashing system, according to an embodiment of the present invention.

FIG. 3 shows a functional block diagram of example modules of the hashing system 100 for a hashing process, according to an embodiment of the invention. According to an embodiment of the invention, an application 102 comprises a computer application that may run on a data processing system such as data processing system 11 in FIG. 2. The application 102 uses an insertion module 104 to add items and a probing module 106 to find items in a table 108, according to an embodiment of the invention. The table 108 may be a data structure within a computer memory, such as main memory 42 of FIG. 2. The information in the table 108 may be used to initialize application 102. The table 108 may be a flat file, an array or a hash table according to embodiments of the invention.

A hash table stores probe keys, or both keys and payloads, where a payload is an additional column to carry over for join, or aggregation columns for grouping, or an offset to the real payload. The data stored in a hash table can be compressed. For example, a hash key can be a CITY column, which is a varchar (100) type, while there are only 1000 cities in the database, and hence only 10 bits, instead of 100 bytes, are sufficient to represent a city. In this case, the offsets to the real payload only need 10 bits, instead of a 64-bit integer. Embodiments of the hashing system 100 utilizes compression by forming hash tables on compressed keys, payloads, or offsets, and hashing and probing directly on compressed keys.

According to embodiment of the invention, hash table insertion comprises storing compressed keys, wherein payloads are packed as bit-aligned in a fixed-sized bucket. Hash table probing comprises probing for compressed keys. As such, probing comprises receiving a compressed key with a hash value. For a bucket of a hash table, it is determined if a value stored in the chunks of the bucket equals the value of the hash of the compressed key. If no chunks remain to be probed in the bucket, the next bucket in the hash table is probed.

According to an embodiment of the invention, the keys and payloads in a hash table are compressed, and a hash table bucket is of a cacheline size. The hash table bucket can store multiple (key, payload) pairs in a fully associative manner. Probing or inserting a key operates directly on the original packed and compressed bucket without data extraction and decompression. During key insertion and probing, multiple slots, each either holding a key or empty, in a packed hash table bucket are examined simultaneously.

Figure 4:
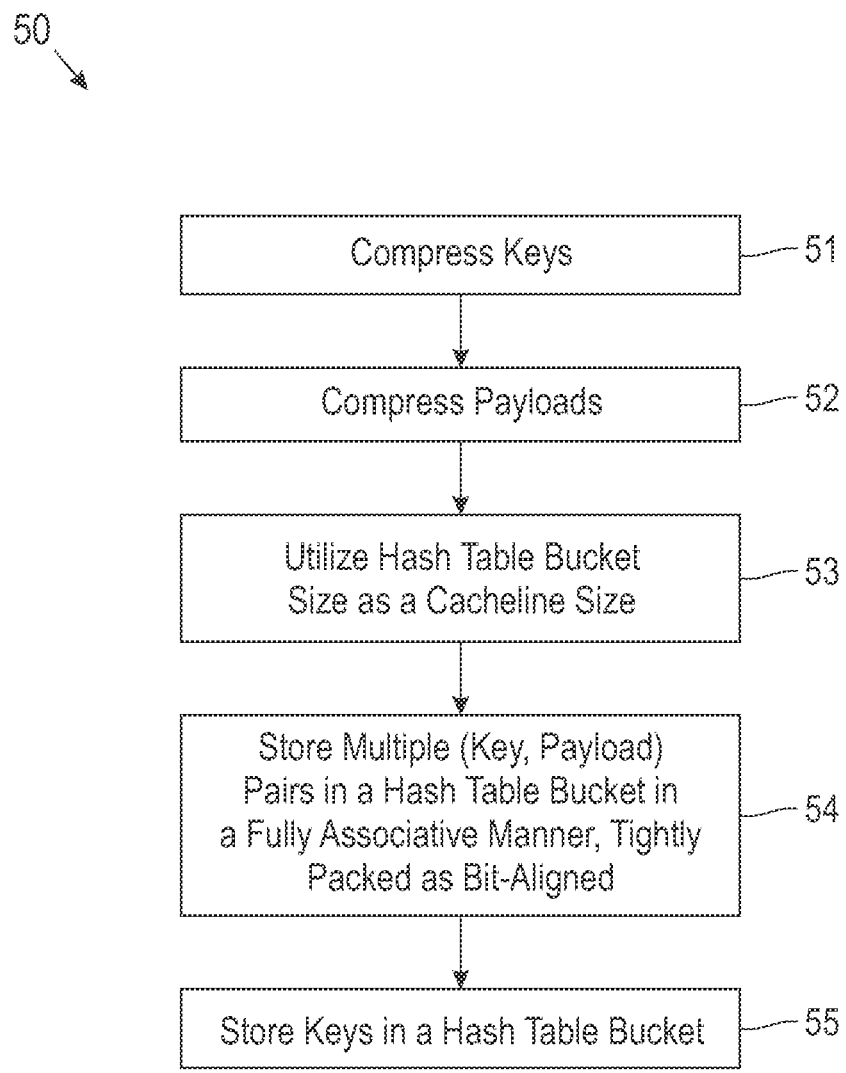
FIG. 4 shows a flowchart illustrating an storing operation of a hashing process, according to an embodiment of the present invention.

FIG. 4 is a flowchart of an insertion process 50 for the insertion module 104, according to an embodiment of the invention. Process block 51 comprises compressing keys. Process block 52 comprises compressing corresponding payloads. Process block 53 comprises utilizing hash table bucket size as a cacheline size for the processing system. Process block 54 comprises storing multiple (key, payload) pairs in a hash table bucket in a fully associative manner, tightly packed as bit-aligned. Process block 55 comprises storing keys in a hash table bucket.

In one embodiment, said insertion module 104 treats a hash table as a two dimensional array H[i][j]. A hash table bucket H[i] is of a cacheline size (e.g., 512 bits), with 8 H[i][j] chunks, wherein each chunk is 64-bit-wide. The compressed key and payloads are tightly packed in a hash table bucket, only leaving the last few bits unused if any. The number of (key, payload) pairs stored in a hash table bucket is based on a ratio as:

(cacheline size−other per cacheline data structure size)/(compressed key size+compressed payload size).

In the above example, a pair of (key, payload) is 20 bits, such that a hash table bucket can accommodate 25 (key, payload) pairs for open addressing hash table. All the keys are stored next to each other and all the payloads are stored next to each other, with keys and payloads in the same order, in a hash table bucket as shown by an example hash table bucket in FIG. 5A (as such, probing a key requires accessing only the contiguous bits storing the keys).

For a closed addressing hash table with chaining, there is a pointer in each bucket linking with a previous bucket, wherein an e.g., 512-bit bucket can accommodate (512−64)/20=22 (key, payload) pairs, as shown by an example hash table bucket in FIG. 5B.

A hash table bucket is fully associative, wherein a compressed key can be stored in any empty key slot in a bucket. Two example implementations of said probing module 106 for probing a key in a hash table, according to embodiments of the invention, are described below.

Figure 6:
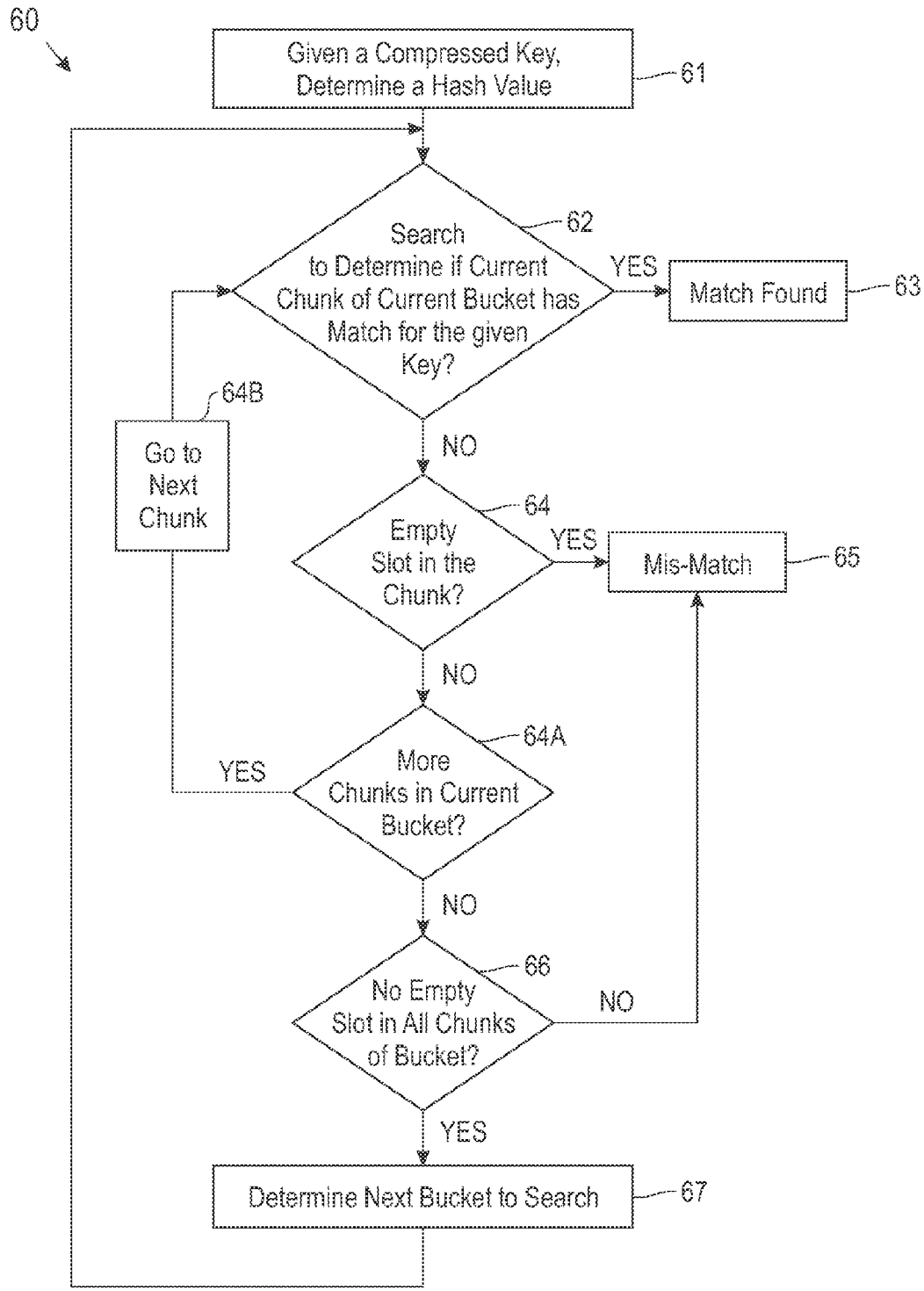
FIG. 6 shows a flowchart illustrating a probing operation of a hashing process, according to an embodiment of the present invention.

FIG. 6 is a flowchart of a probing process 60 for the probing module 106 for probing a given key (i.e., input key) in a hash table, wherein keys are of size of power of 2, according to an embodiment of the invention. In a hash probe operation on a bucketized hash table, given a compressed hash key, a hash value is calculated using multiplicative hash functions over the compressed key modulo the number of hash table cache-line buckets. If a key is found in a current chunk, it is a match. If a key is not found and there is an empty slot in a current chunk, that means such key does not exist in the hash table, hence a mis-match. If a key is not found, this process is repeated on the subsequent chunks. If there is no empty slot in all chunks of a bucket, searching continues on the next bucket until reaching a state of match or mis-match.

Referring to FIG. 6, to probe a hash table given a compressed key, process block 61 calculates a hash value using multiplicative hash functions over the compressed key modulo the number of hash table cacheline buckets. Process block 62 searches (i.e., probes) a current chunk of a current bucket using the hash to determine if a key is found in the current chunk of the current bucket, which is a match to the given key. If a matching key is not found in the current chunk, the process proceeds to process block 64, otherwise the process proceeds to process block 63 which declares a matching state for the given key is found.

In process block 64, if there is an empty slot in the current chunk, that means that they key does not exist in the hash table, a mis-match state is declared in process block 65. Otherwise, in process block 64A it is determined if there are additional chunks in the bucket. If there are, the process goes to the next chunk in block 64B, and continues with process block 62. If there are no additional chunks, in process block 66 it is determined if there is no empty slot in all chunks of the current bucket. If an empty slot is found, the process proceeds to block 65 where a mis-match is declared. If there are no empty slots in any of the chunks of the bucket, the next bucket must be searched, otherwise a mismatch is declared.

If no empty slot in all chunks of the current bucket, then the process proceeds to process block 67, wherein it is determined a next bucket to probe. The process then proceeds back to process block 62 wherein searching for the given key continues in the next bucket as the current bucket, until reaching a state of match or mis-match for the given key, having searched relevant buckets.

In one embodiment, the next bucket to search (i.e., probe) is determined in process block 67 by a hash table collision resolution algorithm. For example, the next bucket can be the immediate following cacheline in opening addressing hash table with linear probing, or the next bucket following the pointer in closed addressing hash table with chaining, etc. In one example, a bitVector is used to indicate which slot to retrieve payload from for the matching state, and which slot to insert a (key, payload) pair to for the mismatch state.

In one implementation, a number_of_key_chunks_in_a_bucket value is calculated using the following mathematical operation:

ceiling(number of bits presenting keys in a bucket/size of a chunk).

For example, if a key size is 8 bits and payload is 8 bit, a 512-bit bucket can hold 32 keys and 32 payloads:

number_of_key_chunks_in_a_bucket=ceiling((8 bits/key*32 keys)/(64 bits/chunk))=4 chunks.

Table 1 below shows a probing pseudo code example of the probing process 60, according to an embodiment of the invention.

TABLE 1

| Example hash table probing process |
|---|
| hash_bucket = hash_fuction(compressed_key);<br>isMatch = false;<br>isMismatch = false;<br>bitVector = 0ull;<br>while (isMatch is false) and (isMismatch is false) {<br>  for (i=0; i < number_of_key_chunks_in_a_bucket; i++) {<br>    isMatch = find_match(H[hash_bucket][i], compressed_key, bitVector);<br>    isMismatch = (isMatch is false) and<br>(find_match(H[hash_bucket][i], empty_slot, bitVector) is true);<br>    if (isMatch is true) or (isMismatch is true)<br>      break;<br>  }<br>  else<br>    get the next hash_bucket;<br>} |

In one embodiment of the invention, a parallel data processing scheme is used, wherein tuple algebra is used in find_match function above, to compare a compressed key or an empty slot against all the slots in a 64-bit chunk simultaneously. If a match is found, find_match returns a 64-bit bitVector with only the most significant bit of the matching slot in the bucket turned on as 1. The MSBMask is a bit mask with most significant bit set to 1 for all the key slots, and the inverseMSBMask is a reversed bit mask of the MSBMask. The multiplyMask[i] is the per bucket mask to multiply with the compressed_key or empty_slot to form a 64-bit chunk filled with the compressed_keys or empty_slot one after another. Similarly, if an empty slot is found, it returns a 64-bit bitVector with only the most significant bit of the matching empty slot in the bucket turned on as 1. An example pseudo code for the find_match function is shown in Table 2 below, according to an embodiment of the invention.

TABLE 2

Example find match process

```
bool find_match(H[hash][i], compressed_key, & bitVector) {
    vectorized_compressed_key = multiplyMask[i] * compressed_key;
    xorData = vectorized_compressed_key ^ H[hash][i];
        bitVector = xorData | (( xorData & inverseMSBMask ) + inverseMSBMask);
        bitVector = MSBMask - (bitVector & MSBMask);
        return (bitVector > 0ull);
}
```

An alternative probing process according to an embodiment of the invention comprises a variation of the above probing process. According to said alternative probing process, a key stored in a bucket can straddle 64-bit chunk boundary, according to an embodiment of the invention. The above tuple algebra is extended to check a given key (input key) against all the slots fully contained in a chunk and slots partially contained in a chunk. A isPartialMatch function to check if a given key is partially matched only at the low order bits of a chunk. If isPartialMatch is true in a current chunk, then it is checked if the remaining part of the key is partially matched at the high order bits of the next chunk. If in both places a match is found, then a full match for the given key has been found. Table 3 below shows a probing pseudo code example of said alternative probing process, according to an embodiment of the invention.

TABLE 3

Example hash table probing process

```
hash_bucket = hash_fuction(compressed_key);
isMatch = false;
isMismatch = false;
isPartialMatch = false;
bitVector = 0ull;
while (isMatch is false) and (isMismatch is false) {
    for (i=0; i < number_of_key_chunks_in_a_bucket; i++) {
        isMatch = find_match_partial(H[hash_bucket][i],
compressed_key, bitVector, isPartialMatch);
        isMismatch = (isMatch is false) and
(find_match_partial(H[hash_bucket][i], empty_slot, bitVector, isPartialMatch) is true);
        if (isMatch is true) or (isMismatch is true)
            break;
    }
    if (isMatch is true) or (isMismatch is true)
        break;
    else
        get the next hash_bucket;
}
```

For example, a number_of_key_chunks_in_a_bucket value is determined by the following mathematical operation:

$$\text{ceiling}((10 \text{ bits/key} * 25 \text{ keys})/(64 \text{ bits/chunk})) = 4 \text{ chunks.}$$

In function find_match_partial above, firstKeyMSBMask is a mask with most significant bit of the first partial slot set to 1. Further, lastKeyMSBMask is a mask with most significant bit of the last partial slot set to 1. In addition, completeKeyMask is a mask with most significant bit of the slots fully contained in the bucket set to 1. An example pseudo code for the find_match_partial function is shown in Table 4 below, according to an embodiment of the invention.

TABLE 4

Example find_match_partial process

```
bool find_match_partial(H[hash][i], compressed_key, & bitVector, & isPartialMatch) {
    vectorized_compressed_key = multiplyMask[i] * compressed_key;
    xorData = vectorized_compressed_key ^ H[hash][i];
        bitVector = xorData | (( xorData & inverseMSBMask ) + inverseMSBMask);
        bitVector = MSBMask - (bitVector & MSBMask);
        isMatch = (isPartialMatch && (bitVector & firstKeyMSBMask > 0)) ||
((bitVector & completeKeyMSBMask) > 0)
        isPartialMatch = (bitVector & lastKeyMSBMask) > 0;
        return isMatch;
    }
```

In one embodiment, a parallel data processing scheme (e.g., in Table 2 and Table 4) generally comprises computing a mask where the value being compared is repeated multiple times, in the same bit-format as the format in which the keys are packed in the chunk, and compare this mask against the chunk.

Figure 7:
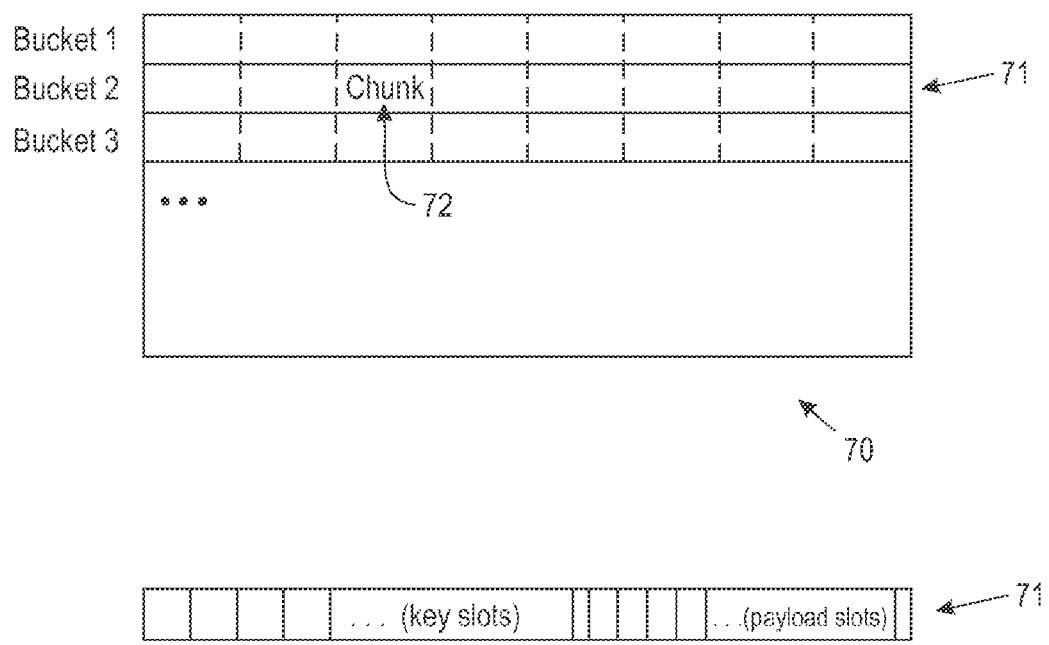
FIG. 7 shows a hash table, buckets, chunks, and slots, according to an embodiment of the invention.

FIG. 7 shows a hash table 70 according to an embodiment of the invention. The hash table 70 comprises multiple buckets 71 (e.g., Bucket 1, Bucket 2, ... ). Each bucket 71 is divided into a fixed number (e.g., 8) of chunks 72, and each chunk is of a fixed size (e.g., 64 bits). Each bucket 71 holds one or more keys in one or more key slots, and an equal number of payloads in one or more payload slots. The keys and payloads are stored in fixed size slots. A slot can straddle multiple chunks.

Embodiments of the invention allow storing multiple key and value pairs in each hash bucket by splitting the bucket into slots. Embodiments of the invention provide efficient simultaneous lookup (probing) into all the slots in a bucket. Embodiments of the invention provide cacheline utilization by placing key and value pairs in a hash bucket. Embodiments of the invention allow simultaneous comparison of keys in all slots of a bucket or operation on compressed keys. In one embodiment of the invention for storing data items in a computer, a plurality of hash functions of data values in a data item are computed. A corresponding memory location is determined for one of the plurality of hash functions. The data item and a key portion and a payload portion of all data items are stored contiguously within the memory location.

In one embodiment of the invention for retrieving data items in a computer, a plurality of hash functions of data values in a probe key are computed. A corresponding memory location is determined for each of the plurality of hash functions. Data items in each memory location are examined to determine a match with the probe key. If a match is found, a payload of the matching stored data item is returned. All of the steps are performed free of conditional branch instructions.

Embodiments of the invention are useful with general hash tables, such as open-addressing hash table, with linear probing, quadratic probing, or cuckoo hashing, and closed-addressing hash tables with chaining, etc. In one embodiment using an open addressing hash table, a cacheline-sized bucket is used to store tightly-packed keys and payloads in a fully associative manner. When probing for an input key and a match is not found or there is mismatch in a current bucket, a next bucket is loaded and checked for the input key with linear probing. The next bucket may be with a certain distance from the current bucket with quadratic probing, or another bucket located by another hash function with cuckoo hashing.

In one embodiment using a closed-addressing hash table with chaining, space is reserved in a cacheline bucket for storing a 64-bit pointer for chaining, and the remaining space is used to store tightly packed keys and payloads. When probing a key and a match is not found or mismatch in a current bucket, a next bucket following the pointer is loaded and checked for the input key.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for probing a hash table, the method comprising:
storing a compressed payload portion of all data items contiguously within a memory location;
storing a compressed key portion of all data items contiguously within the memory location, wherein the memory location comprises a bucket in a bucketized hash table, and each bucket is sized to store multiple pairs of compressed key portions and compressed payload portions;
receiving a compressed input key;
computing a hash value for the compressed input key; and
probing, using a probing processor, one or more buckets in the hash table for a match, each bucket including multiple chunks, comprising:
for a bucket in the hash table, searching chunks in that bucket by comparing in parallel the hash value with a plurality of slots in each chunk, such that if a value in a chunk equals the hash value of the compressed input key, then a match is declared and a vector is returned as a result with a significant bit of a matching slot in the bucket set to a value of 1;
if a value stored in a chunk corresponds to an empty slot, then a mismatch is declared, and the vector is returned as the result with the significant bit of a matching empty slot set to the value of 1; and
performing a first search in the bucket for a partial match with low order bits of a current chunk, such that if a partial match is found, performing a second search of the current chunk for the remaining portion of the hash value of the compressed input key for a partial match at high order bits of a next chunk in the bucket.

2. The method of claim 1, further comprising:
if no chunks remain to be searched in the bucket, searching a next bucket in the hash table.

3. The method of claim 2, further comprising:
applying a multiplying mask per bucket mask on the compressed input key to form a chunk filled with compressed keys one after another; and
applying a bit mask to the vector with a most significant bit set to the value of 1 for all key slots.

4. The method of claim 1, wherein
if a match is found in both the first search and the second search, then a match is declared.

5. The method of claim 4, further comprising:
applying a first key bit mask to the vector with a most significant bit of a first partial slot set to the particular value or applying a last key bit mask to the vector with a most significant bit of slots fully contained in the bucket set to the particular value.

6. The method of claim 1, wherein comparing in parallel comprises:
computing a mask where the hash value being compared is repeated multiple times, in a same bit-format as a format in which compressed input keys are packed in a current chunk being searched; and
comparing the mask against the current chunk.

7. The method of claim 1, wherein each bucket is sized to store multiple pairs of compressed key portions and a compressed payload portion, and each slot is sized to store a compressed key portion.

8. A computer program product for probing a hash table in a memory device, the computer program product comprising a computer readable storage device having program instructions embodied therewith, wherein the computer readable storage device is not a transitory signal per se, the program instructions readable by a processor to perform a method comprising:
  storing, by the processor, a compressed payload portion of all data items contiguously within a memory location;
  storing, by the processor, a compressed key portion of all data items contiguously within the memory location, wherein the memory location comprises a bucket in a bucketized hash table, and each bucket is sized to store multiple pairs of compressed key portions and compressed payload portions;
  receiving, by the processor, a compressed input key;
  computing, by the processor, a hash value for the compressed input key; and
  probing, by the processor, one or more buckets in the hash table for a match, each bucket including multiple chunks, comprising:
    for a bucket in the hash table, searching, by the processor, chunks in that bucket by comparing in parallel the hash value with a plurality of slots in each chunk, such that if a value in a chunk equals the hash value of the compressed input key, then a match is declared and a vector is returned as a result with a significant bit of a matching slot in the bucket set to a value of 1;
    if a value stored in a chunk corresponds to an empty slot, then a mismatch is declared, and the vector is returned as the result with the significant bit of a matching empty slot set to the value of 1; and
    for a bucket in the hash table, performing a first search in the bucket for a partial match with low order bits of a current chunk, such that if a partial match is found, performing a second search of the current chunk for the remaining portion of the hash value of the compressed input key for a partial match at high order bits of a next chunk in the bucket.

9. The computer program product of claim 8, wherein the method further comprises
  if no chunks remain to be searched in the bucket, searching, by the processor, a next bucket in the hash table.

10. The computer program product of claim 9, wherein the method further comprises:
  applying, by the processor, a multiplying mask per bucket mask on the compressed input key to form a chunk filled with compressed keys one after another; and
  applying, by the processor, a bit mask to the vector with a most significant bit set to the value of 1 for all key slots.

11. The computer program product of claim 8, wherein if a match is found in both the first search and the second search, then a match is declared.

12. The computer program product of claim 11, wherein the method further comprises:
  applying a first key bit mask to the vector with a most significant bit of a first partial slot set to the value of 1 or applying a last key bit mask to the vector with a most significant bit of slots fully contained in the bucket set to the value of 1.

13. The computer program product of claim 8, wherein comparing in parallel comprises:
  computing a mask where the hash value being compared is repeated multiple times, in a same bit-format as a format in which compressed input keys are packed in a current chunk being searched; and
  comparing the mask against the current chunk.

14. The computer program product of claim 8, wherein each bucket is sized to store multiple pairs of compressed key portions and a compressed payload portion, and
  each slot is sized to store a compressed key portion.

15. A system for probing a hash table in a memory device, comprising:
  a memory device that stores a compressed payload portion of all data items contiguously within a memory location, and stores a compressed key portion of all data items contiguously within the memory location, wherein the memory location comprises a bucket in a bucketized hash table, and each bucket is sized to store multiple pairs of compressed key portions and compressed payload portions;
  a hashing interface that receives a compressed input key and computes a hash value for the compressed input key; and
  a probing processor that performs a probing process on one or more buckets in the hash table for a match, each bucket including multiple chunks, the probing processor further:
    for a bucket in the hash table, searches chunks in that bucket by comparing in parallel the hash value with a plurality of slots in each chunk, such that if a value in a chunk equals the hash value of the compressed input key, then a match is declared and a vector is returned as a result with a significant bit of a matching slot in the bucket set to a value of 1;
    if a value stored in a chunk corresponds to an empty slot, then a mismatch is declared; and the vector is returned as the result with the significant bit of a matching empty slot set to the value of 1; and
  for a bucket in the hash table, the probing processor performs a first search in the bucket for a partial match with low order bits of a current chunk, such that if a partial match is found, the probing processor performs a second search of the current chunk for the remaining portion of the hash value of the compressed input key for a partial match at high order bits of a next chunk in the bucket.

16. The system of claim 15, wherein if no chunks remain to be searched in the bucket, the probing processor further searches a next bucket in the hash table.

17. The system of claim 16, wherein the probing processor applies a multiplying mask per bucket mask on the compressed input key to form a chunk filled with compressed keys one after another, and applies a bit mask to the vector with a most significant bit set to the value of 1 for all key slots.

18. The system of claim 15, wherein
  if a match is found in both the first search and the second search, then a match is declared.

19. The system of claim 16, wherein the probing processor further:
  applies a first key bit mask to the vector with a most significant bit of a first partial slot set to the value of 1 or applies a last key bit mask to the vector with a most significant bit of slots fully contained in the bucket set to the value of 1;
  computes a mask where the hash value being compared is repeated multiple times, in a same bit-format as a format in which compressed input keys are packed in a current chunk being searched; and
  compares the mask against the current chunk.

20. The system of claim 15, wherein each bucket is sized to store multiple pairs of compressed key portions and a compressed payload portion, and each slot is sized to store a compressed key portion.

\* \* \* \* \*